(12) United States Patent
Huang et al.

(10) Patent No.: US 10,076,971 B2
(45) Date of Patent: Sep. 18, 2018

(54) SPLIT ELECTRIC VEHICLE (EV) BATTERY INCLUDING BOTH A REPLACEABLE AND FIXED PORTION

(71) Applicant: NIO NEXTEV LIMITED, Central OT (HK)

(72) Inventors: Chendong Huang, San Jose, CA (US); Jie Fang, San Jose, CA (US); Wenpeng Zhao, San Jose, CA (US); Yaping Jiang, San Jose, CA (US); Xiaojia Deng, San Jose, CA (US)

(73) Assignee: NIO NEXTEV LIMITED, Hong Kong (CN)

( * ) Notice: Subject to any disclaimer, the term of this patent is extended or adjusted under 35 U.S.C. 154(b) by 0 days.

(21) Appl. No.: 15/283,953

(22) Filed: Oct. 3, 2016

(65) Prior Publication Data

US 2018/0009331 A1    Jan. 11, 2018

Related U.S. Application Data

(60) Provisional application No. 62/358,329, filed on Jul. 5, 2016.

(51) Int. Cl.
*H02P 1/00* (2006.01)
*B60L 11/18* (2006.01)
(Continued)

(52) U.S. Cl.
CPC ............ *B60L 11/1864* (2013.01); *B60K 1/04* (2013.01); *B60L 11/1861* (2013.01);
(Continued)

(58) Field of Classification Search
CPC ............ Y02T 10/7005; Y02T 10/7066; Y02T 10/7077; Y02T 10/6217; Y02T 10/7072; Y02T 90/14; Y02T 10/7241; Y02T 10/7044; Y02T 10/7061; Y02T 90/127; Y02T 90/121; Y02T 10/6239; Y02T 10/7216; Y02T 90/34; H02J 7/14; H02J 7/00; H02J 7/04; H02J 7/24; H01M 6/50; H01M 10/44; H01M 10/46; H02P 1/00; H02P 3/00; H02P 6/00; H02P 27/04; H02P 27/06; H02P 1/46; H02P 3/18; H02P 23/00; H02P 27/00
USPC .......... 318/139, 400.01, 700, 701, 727, 800, 318/801; 320/100, 103, 104, 116, 118, 320/124, 125, 127, 128, 134, 135, 136, 320/137, 148, 149, 156, 164
See application file for complete search history.

(56) References Cited

U.S. PATENT DOCUMENTS

6,044,922 A * 4/2000 Field .................. B60K 6/40
180/65.23
6,075,346 A * 6/2000 Kikuchi ............ B60K 6/445
320/137
(Continued)

*Primary Examiner* — Antony M Paul
(74) *Attorney, Agent, or Firm* — Sheridan Ross P.C.

(57) ABSTRACT

A battery for a vehicle having a fixed battery pack and a replaceable battery pack. The replaceable battery pack has electronic or mechanical locks to semi-temporarily hold the replaceable battery pack in place. The fixed battery pack is held in place via permanent or semi-permanent fasteners such as bolts. A battery controller controls the replaceable battery pack to power motors of the vehicle before controlling the fixed battery pack to power motors of the vehicle.

20 Claims, 7 Drawing Sheets

(51) Int. Cl.
    *H01M 2/10*         (2006.01)
    *H01M 10/48*      (2006.01)
    *H01M 10/42*      (2006.01)
    *H01M 10/44*      (2006.01)
    *H02P 4/00*         (2006.01)
    *H02J 7/00*         (2006.01)
    *B60K 1/04*         (2006.01)

(52) U.S. Cl.
    CPC ....... *B60L 11/1877* (2013.01); *H01M 2/1083* (2013.01); *H01M 10/425* (2013.01); *H01M 10/441* (2013.01); *H01M 10/482* (2013.01); *H01M 10/486* (2013.01); *H02J 7/0063* (2013.01); *H02P 4/00* (2013.01); *B60K 2001/0455* (2013.01); *B60L 2240/54* (2013.01); *H01M 2010/4271* (2013.01); *H01M 2220/20* (2013.01); *H02J 2007/0067* (2013.01)

(56) References Cited

U.S. PATENT DOCUMENTS

| | | | | |
|---|---|---|---|---|
| 6,481,516 | B1* | 11/2002 | Field | B60K 6/40 180/65.23 |
| 6,781,343 | B1* | 8/2004 | Demachi | B60L 11/1853 320/101 |
| 7,570,012 | B2* | 8/2009 | Dasgupta | B60L 11/1809 320/104 |
| 7,956,569 | B2* | 6/2011 | Welchko | B60L 11/1868 318/105 |
| 8,030,860 | B2* | 10/2011 | Yoshioka | E02F 3/325 290/4 R |
| 8,053,921 | B2* | 11/2011 | Ichikawa | B60L 11/1868 307/9.1 |
| 8,102,142 | B2* | 1/2012 | Smith | B60L 11/1868 180/65.1 |
| 8,395,355 | B2* | 3/2013 | Kaita | B60L 11/123 180/65.31 |
| 8,486,548 | B2* | 7/2013 | Ueda | H01M 10/441 429/61 |
| 8,515,605 | B2* | 8/2013 | Takaoka | B60K 6/365 180/65.1 |
| 8,618,771 | B2* | 12/2013 | Ichikawa | B60L 11/123 320/109 |
| 2008/0111508 | A1* | 5/2008 | Dasgupta | B60L 11/1809 318/139 |
| 2008/0218104 | A1* | 9/2008 | Lukic | B60L 11/005 318/139 |
| 2009/0033252 | A1* | 2/2009 | Smith | B60L 11/1868 318/139 |
| 2009/0033253 | A1* | 2/2009 | Nagashima | B60L 11/1868 318/139 |
| 2009/0033258 | A1* | 2/2009 | Atarashi | B60K 6/485 318/400.3 |
| 2009/0034308 | A1* | 2/2009 | Welchko | B60L 11/1868 363/133 |
| 2009/0173554 | A1* | 7/2009 | Yoshioka | E02F 3/325 180/65.8 |
| 2010/0019723 | A1* | 1/2010 | Ichikawa | B60L 11/123 320/109 |
| 2010/0019729 | A1* | 1/2010 | Kaita | B60L 11/123 320/134 |
| 2010/0065351 | A1* | 3/2010 | Ichikawa | B60L 11/1868 180/65.8 |
| 2010/0136390 | A1* | 6/2010 | Ueda | H01M 10/441 429/61 |
| 2010/0138087 | A1* | 6/2010 | Takaoka | B60K 6/365 701/22 |
| 2011/0313613 | A1* | 12/2011 | Kawahara | H01M 10/441 701/34.4 |
| 2013/0038271 | A1* | 2/2013 | Park | B60K 6/28 320/104 |
| 2013/0300191 | A1* | 11/2013 | Takaoka | B60K 6/365 307/9.1 |
| 2014/0350761 | A1* | 11/2014 | Endo | B60W 20/00 701/22 |
| 2014/0358347 | A1* | 12/2014 | Endo | B60K 6/445 701/22 |
| 2015/0217660 | A1* | 8/2015 | Manabe | H01M 8/0494 307/23 |
| 2015/0298571 | A1* | 10/2015 | Kim | B60L 11/1861 701/22 |
| 2016/0052396 | A1* | 2/2016 | Tsuchiya | B60L 3/0046 318/139 |

\* cited by examiner

SPLIT ELECTRIC VEHICLE (EV) BATTERY INCLUDING BOTH A REPLACEABLE AND FIXED PORTION

CROSS REFERENCE TO RELATED APPLICATIONS

This application claims the benefit of U.S. Provisional Patent Application No. 62/358,329, filed Jul. 5, 2016, which is incorporated by reference as if fully set forth.

FIELD OF INVENTION

This application is related to batteries for electric vehicles, and, more specifically, to a split electric vehicle battery including both a replaceable and fixed portion.

BACKGROUND

Battery technology for electric vehicles is making great advancements. However, one aspect in which battery technology still lags behind hydrocarbon fuel is in the area of energy replenishment time. More specifically, physical delivery of hydrocarbon fuel delivers energy in a very rapid manner compared with the rate with which energy can be delivered to an electric vehicle via the electric grid.

SUMMARY

A battery system is provided. The battery system includes a fixed battery pack, a replaceable battery pack, and a battery controller. The battery controller is configured to detect electrical characteristics of the fixed battery pack. The battery controller is also configured to detect electrical characteristics of the replaceable battery pack. The battery controller is further configured to compare the electrical characteristics of the fixed battery pack with the electrical characteristics of the replaceable battery pack. The battery controller is also configured to control either or both of the fixed battery pack and the replaceable battery pack to power one or more motors based on the comparison between the electrical characteristics of the fixed battery pack and the electrical characteristics of the replaceable battery pack.

A method for controlling a battery system including a fixed battery pack and a replacement battery pack is also provided. The method includes detecting electrical characteristics of the fixed battery pack. The method also includes detecting electrical characteristics of the replaceable battery pack. The method further includes comparing the electrical characteristics of the fixed battery pack with the electrical characteristics of the replaceable battery pack. The method also includes controlling either or both of the fixed battery pack and the replaceable battery pack to power one or more motors based on the comparison between the electrical characteristics of the fixed battery pack and the electrical characteristics of the replaceable battery pack.

A vehicle is also provided. The vehicle includes a first motor configured to power a set of wheels and a battery system. The battery system includes a fixed battery pack, a replaceable battery pack, and a battery controller. The battery controller is configured to detect electrical characteristics of the fixed battery pack. The battery controller is also configured to detect electrical characteristics of the replaceable battery pack. The battery controller is further configured to compare the electrical characteristics of the fixed battery pack with the electrical characteristics of the replaceable battery pack. The battery controller is also configured to control either or both of the fixed battery pack and the replaceable battery pack to power one or more motors based on the comparison between the electrical characteristics of the fixed battery pack and the electrical characteristics of the replaceable battery pack.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE DRAWINGS

Figure 1:
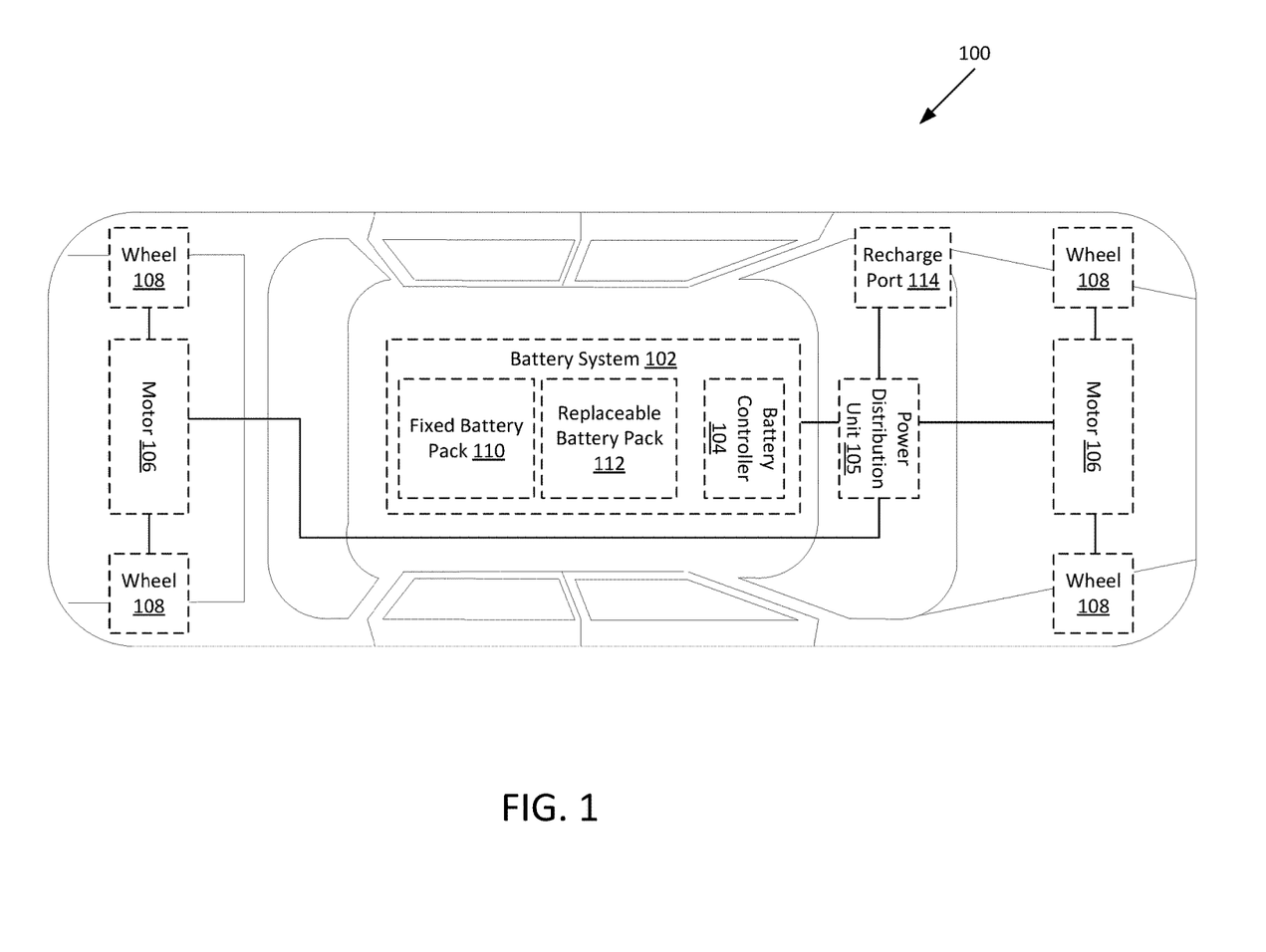
FIG. 1 is a block diagram of a vehicle, illustrating various aspects related to a battery system, according to an example.

FIG. 1 is a block diagram of a vehicle 100, illustrating various aspects related to a battery system 102, according to an example. The vehicle 100 is a primarily electric vehicle that is powered primarily or exclusively by electric power from the battery system 102, as opposed to from chemical energy stored in a hydrocarbon fuel as in a more traditional vehicle. The battery system 102 is therefore configured with sufficient capacity and to provide sufficient power to move the vehicle 100.

As shown, the vehicle 100 includes the battery system 102 (which includes a battery controller 104), a battery recharge port 114, a power distribution unit 105, and one or more motors 106 coupled to a plurality of wheels 108. The battery controller 104 can be any technically feasible control mechanism including a programmable processor that executes instructions stored in a memory, an application-specific integrated circuit, or any other technically feasible mechanism. The recharge port 114 includes a connector shaped and configured to connect to a recharger and to provide electrical energy from the recharger to the battery system 102 for recharging. The power distribution unit 105 includes circuitry configured to distribute power from the battery system 102 to the one or more motors 106 in any technically feasible manner.

The battery system 102 includes a battery controller 104, a fixed battery pack 110, and a replaceable battery pack 112. Each of the fixed battery pack 110 and the replaceable battery pack 112 includes a plurality of battery cells that are configured to store energy and to provide electrical energy from the stored energy on demand. The cells may be organized into battery modules and the battery modules may be further organized to form sub-packs. Each of the fixed battery pack 110 and the replaceable battery pack 112 includes one or more sub-packs.

The fixed battery pack 110 is left in the vehicle 100 permanently or semi-permanently. The replaceable battery pack 112 is periodically removed from the vehicle 100 and replaced. The replaceable battery pack 112 thus has physical features such as proximity to an external surface of the vehicle 100, easily accessible and switchable locks (electrically or mechanically controlled), or the like that allow for the replaceable battery pack 112 to be easily removed and for a replacement replaceable battery pack 112 to be installed. One purpose of removing the replaceable battery pack 112 is to allow for quick replenishment of battery-stored energy. Another purpose is to reduce the amount of time necessary to recharge battery energy for the vehicle 100. For example, a driver could recharge a car by recharging only the fixed battery pack 110 while physically replacing a depleted replaceable battery pack 112 with a full replaceable battery pack 112.

When compared with replenishing the fuel of hydrocarbon-powered automobiles, recharging the batteries of an electric vehicle (such as vehicle 100) takes significantly more time. This time difference exists because in general, energy cannot be drawn from the power grid anywhere near as quickly as chemical energy can be delivered in the form of liquid hydrocarbon. The fixed battery pack 110 exists to provide the vehicle 100 with a relatively large amount of available battery power while limiting the physical size of the battery that is to be replaced. In other words, battery replacement is easier than if the entire battery system 102 were replaceable.

The battery controller 104 controls various aspects of the battery system 102. For example, the battery controller 104 controls the manner in which the various components of the battery system 102 are charged and discharged. The battery controller 104 also controls the manner in which the battery system 102 provides electrical energy to the one or more motors 106.

The one or more motors 106 are powered by the battery system 102 and drive the wheels 108 to accelerate the vehicle 100. In one embodiment, one or more motors 106 powers front wheels 108 and one or more motors 106 powers rear wheels 108. Although FIG. 1 illustrates two different motors 106, each separately coupled to power different motors 106, in other embodiments, one or more motors 106 drives all wheels 108 or one or more motors 106 drive only one set of wheels (e.g., only front or only rear), with the other set of wheels being unpowered. The fixed battery pack 110 and replaceable battery pack 112 may cooperate to drive the one or more motors 106 or may drive the one or more motors 106 independently.

FIGS. 2A, 2B, 3A, and 3B illustrate different ways in which the replaceable battery pack 112 and the fixed battery pack 110 provide power to drive the different motors 106. The various ways in which the replaceable battery pack 112 and the fixed battery pack 110 provide power to the different motors 106 exist to accommodate the fact that the fixed battery pack 110 may have different age characteristics than the replaceable battery pack 112. More specifically, because the fixed battery pack 110 is permanent or semi-permanent and the replaceable battery pack 112 is designed to be periodically swapped out for a different replaceable battery pack 112, the age of the two battery packs will generally not be the same. As is known, an aged battery pack has higher internal resistance than a newer battery pack. Thus, an aged battery pack would have a different voltage across its terminals under the same current draw conditions as compared with a newer battery pack. For this reason, if two battery packs of different age are used to power the same motor 106 (e.g., by connecting the two battery packs in parallel), then the battery packs would be limited by the more aged battery pack, leading to inefficiencies. For this reason, the replaceable battery pack 112 and the fixed battery pack 110 are not used to power the same motors 106.

Figure 2A:
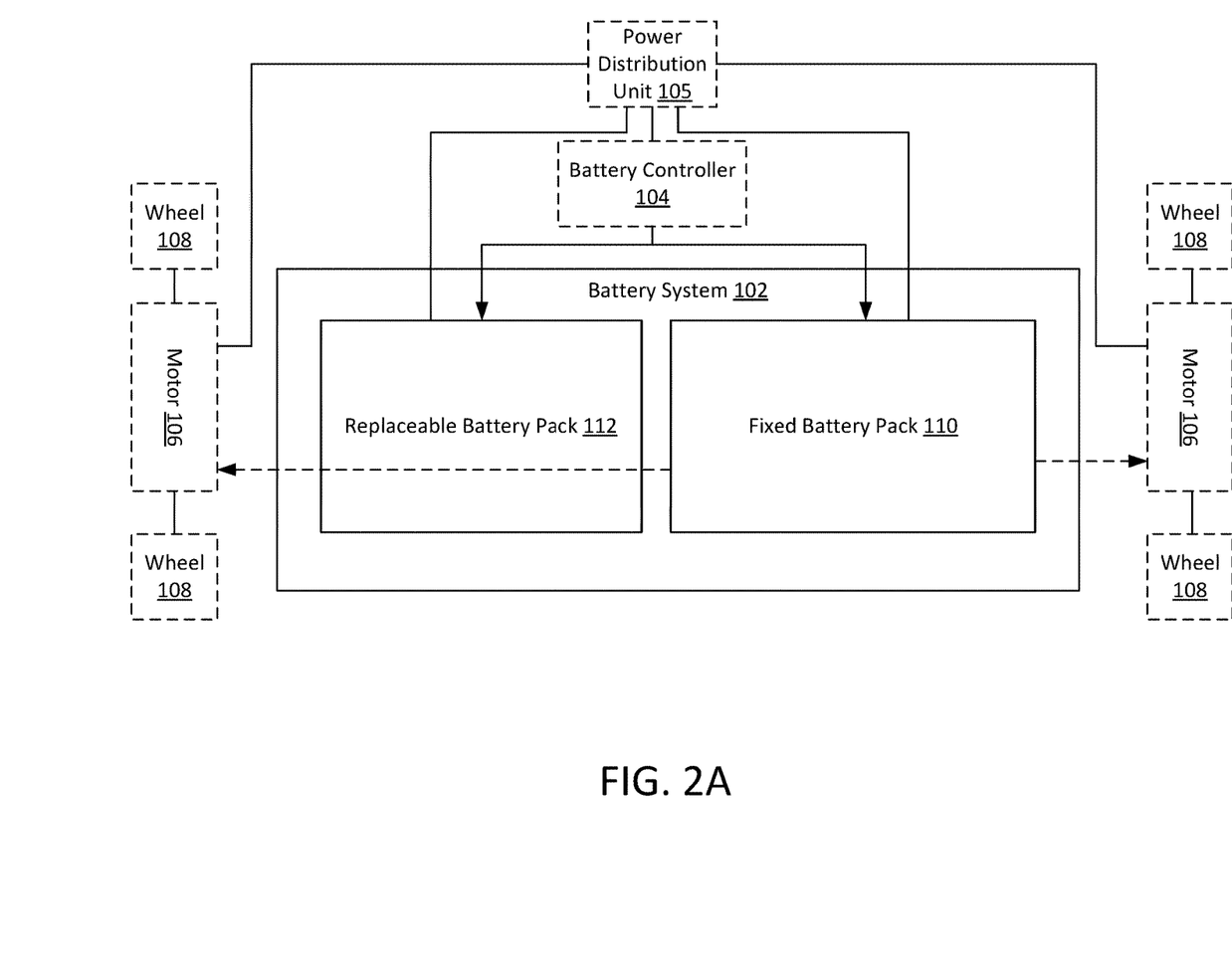
FIGS. 2A and 2B are block diagrams of the battery system of FIG. 1 in a configuration in which the replaceable battery pack provides power to drive one set of wheels and the fixed battery pack provides power to drive another set of wheels, according to an example.

FIG. 2A is a block diagram of the battery system 102 of FIG. 1 in a configuration in which the fixed battery pack 110 provides power to drive both motors 106, according to an example. More specifically, the battery controller 104 controls the fixed battery pack 110 to provide energy to drive both motors 106 to control both sets of wheels 108. Thus, power from the fixed battery pack 110 can be used to power the motors 106 while the replaceable battery pack 112 is not used to power the motors 106.

Figure 2B:
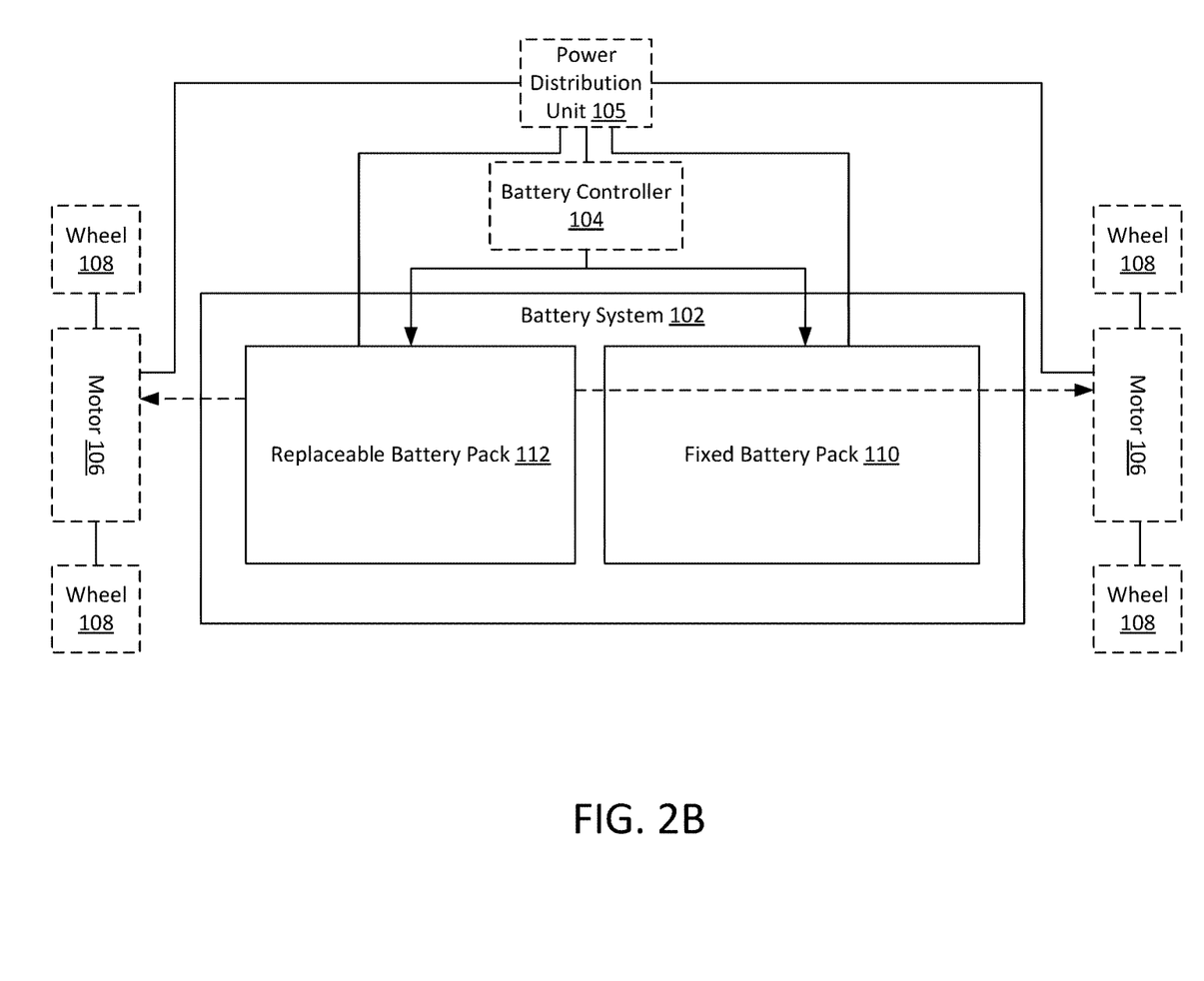

FIG. 2B is a block diagram of the battery system 102 of FIG. 1 in a configuration in which the replaceable battery pack 112 provides power to drive both motors 106, according to an example. More specifically, the battery controller 104 controls the replaceable battery pack 112 to provide energy to drive both motors 106 to control both sets of wheels 108. Thus, power from the replaceable battery pack 112 can be used to power the motors 106 while the fixed battery pack 110 is not used to power the motors 106.

Figure 3A:
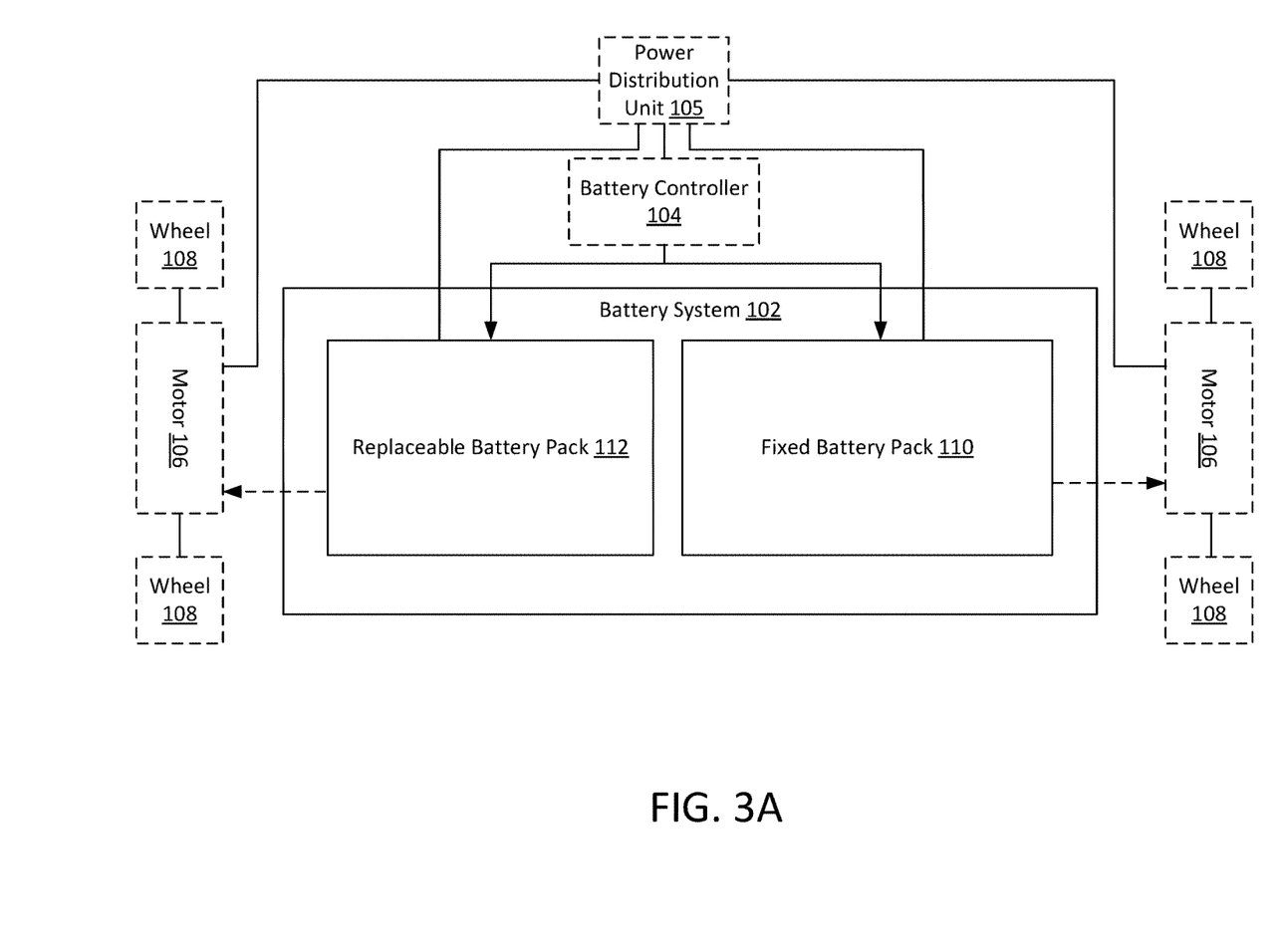
FIGS. 3A and 3B are block diagrams of the battery system of FIG. 1 in a configuration in which the replaceable battery pack and the fixed battery pack are both able to power any of the motors separately or together, according to an example.
Figure 3B:
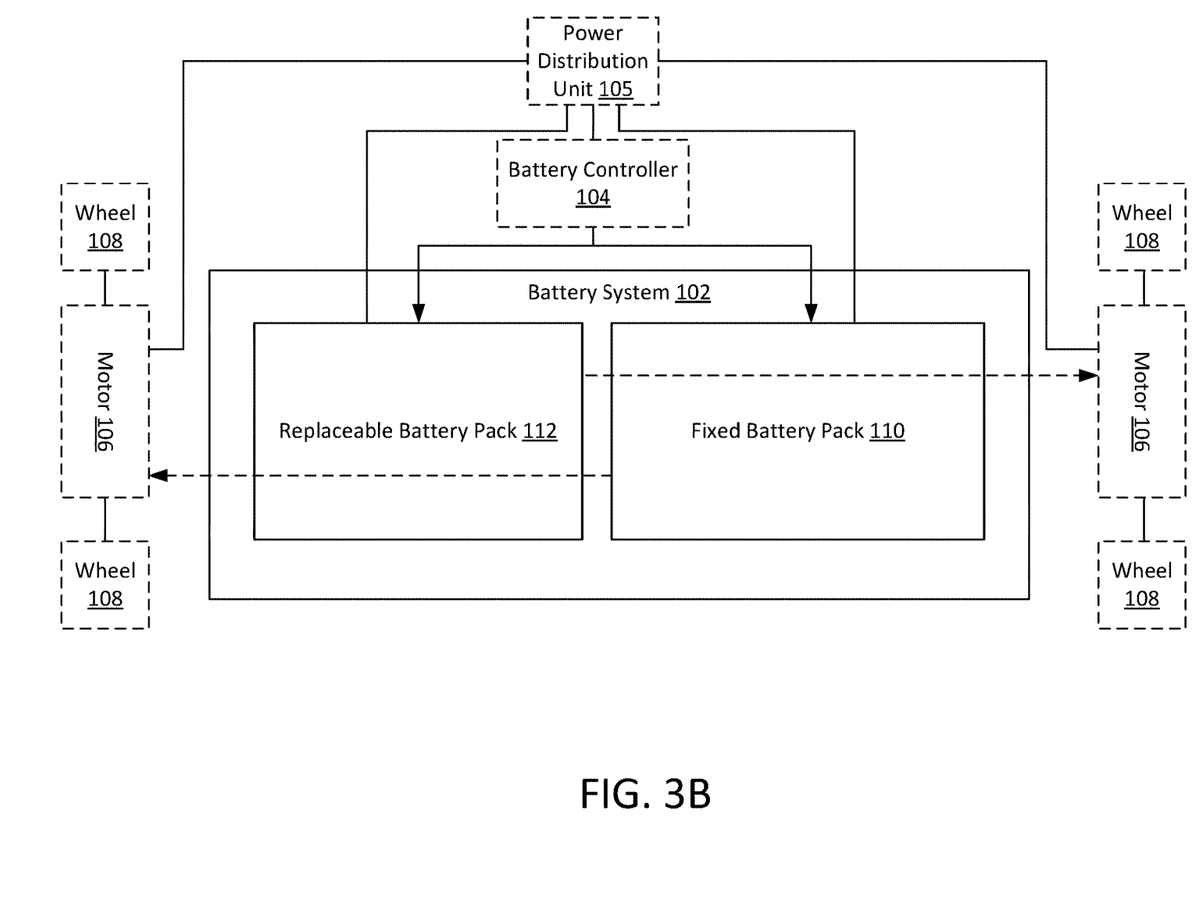

FIGS. 3A and 3B illustrate configurations in which the replaceable battery pack 112 and the fixed battery pack 110 provide power to different motors 106. The battery controller 104 is capable of switching between any of the configurations illustrated in FIGS. 2A, 2B, 3A, and 3B based on a variety of factors. Some examples are now provided.

The battery controller 104 monitors the output (e.g., voltage) of fixed battery pack 110 and the replaceable battery pack 112 and controls which battery pack provides power to the motors 106 based on the results of the monitoring. In some embodiments, the battery controller 104 causes the replaceable battery pack 112 to power one or both motors 106 before causing the fixed battery pack 110 to begin discharging to power one or more motors 106. The battery controller 104 may cause the replaceable battery pack 112 to be discharged (e.g., to power the motors 106) to a minimum charge threshold before the battery controller 104 causes the fixed battery pack 110 to discharge (to power the motors 106). The battery controller 104 may also cause the fixed battery pack 110 and the replaceable battery pack 112 to provide power to both motors 106 separately (i.e., as shown in FIGS. 2A and 2B) when both battery packs are not yet discharged. The battery controller 104 may cause the battery pack with the greater charge to power the motor 106 that requires more power, while causing the battery pack with the lower charge to power the motor 106 that requires less power. In the situation that the vehicle 100 has only one motor 106 or only has motors 106 that power one set of wheels 108, the battery controller 104 may cause the battery pack with the greater charge to power the motor 106 or motors while letting the battery pack with the lower charge to remain unused. Alternatively, the battery controller 104 may discharge the replaceable battery pack 112 before discharging the fixed battery pack 110.

The purpose of controlling the fixed battery pack 110 and replaceable battery pack 112 as described above is to prevent the inefficiencies associated with connecting two differently aged batteries in parallel. More specifically, when connected in parallel, because the internal resistance of one of the batteries is higher than the internal resistance of the other battery, the voltage driven by the connected batteries is limited to the lower voltage of the more aged battery. This result in inefficiencies in that the younger battery operates at a lower voltage than it is able. Disconnecting the batteries thus prevents these inefficiencies from occurring.

In addition to controlling the manner in which the battery packs discharge to power the one or more motors 106, the battery controller 104 also controls the manner in which the battery packs are charged via the recharge port 114. In one example, the battery controller 104 charges the fixed battery pack 110 before charging the replaceable battery pack 112. In other words, if both the fixed battery pack 110 and the replaceable battery pack 112 are substantially discharged, then the battery controller 104 controls the fixed battery pack 110 to be charged (via the recharge port 114) before controlling the replaceable battery pack 112 to be recharged.

Figure 4:
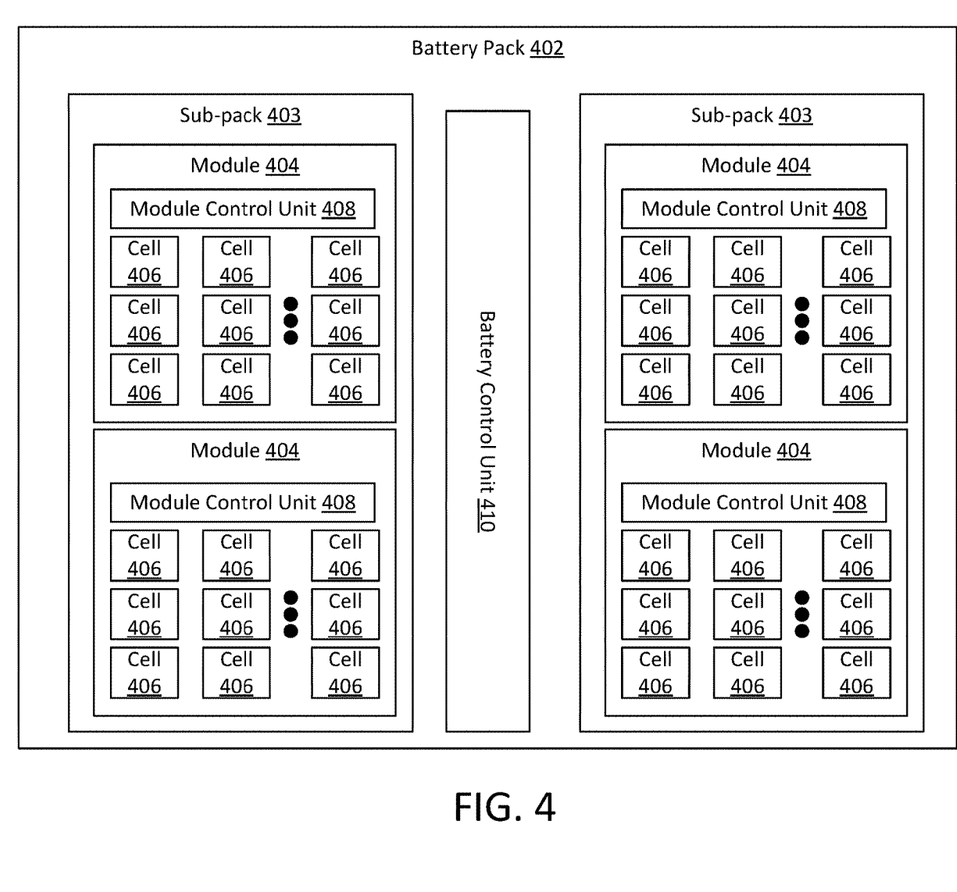
FIG. 4 is a block diagram of a battery pack that can be one of a fixed battery pack or a replaceable battery pack, according to an example.

FIG. 4 is a block diagram of a battery pack 402 that can be one of a fixed battery pack 110 or a replaceable battery pack 112, according to an example. The battery pack 402 includes a battery control unit 410 that controls operation of sub-packs 403 of the battery pack 402. The sub-packs 403 each include one or more modules 404, which each include a module control unit 408 and one or more cells 406.

The cells 406 store energy in chemical form and convert the energy to electrical energy on demand. The cells 406 are connected in series and/or in parallel to produce electricity in a desired characteristic. The module control units 408 detect cell status with voltage and temperature sensors and transmits such data to the battery control unit 410.

One or more modules 404 are provided in each sub-pack 403 and are connected in parallel and/or in series in order to provide electrical energy having desired characteristics. A battery control unit 410 receives, calculates, and makes judgment about the data from the module control units 408 to decide how to connect the modules 404 together. The battery pack 402 may include one battery control unit 410 that controls all of the sub-packs 403 or may include one battery control unit 410 for each of the sub-packs 403.

The battery pack 402 illustrates an example configuration for the replaceable battery pack 112 or the fixed battery pack 110. The number of components, such as sub-packs 403, battery control units 410, modules 404, module control units 408, and cells 406, may be different in the fixed battery pack 110 as compared with the replaceable battery pack 112.

Figure 5:
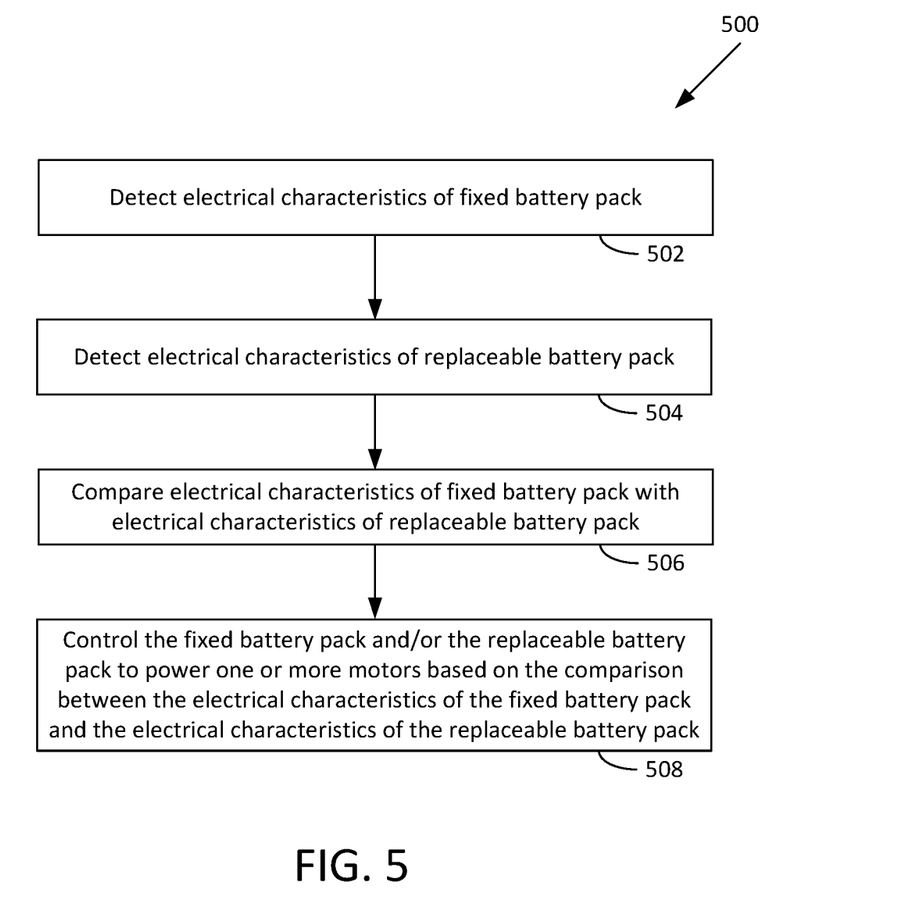
FIG. 5 is a flow diagram of a method for controlling battery discharge, according to an example.

FIG. 5 is a flow diagram of a method 500 for controlling battery discharge, according to an example. Although described with respect to the system shown and described with respect to FIGS. 1-3, it should be understood that any system configured to perform the method, in any technically feasible order, falls within the scope of the present disclosure.

The method 500 begins at step 502, where the battery controller 104 detects electrical characteristics of the fixed battery pack 110. In one example, the battery controller 104 detects the voltage across the terminals of the fixed battery pack 110 when under load conditions associated with powering the motor. At step 504, the battery controller 104 detects electrical characteristics of the replaceable battery pack 112 in a similar manner as with the electrical characteristics of the fixed battery pack 110.

At step 506, the battery controller 104 compares the electrical characteristics of the fixed battery pack 110 with the electrical characteristics of the replaceable battery pack 112. In one example, the battery controller 104 determines whether the replaceable battery pack 112 has been completely discharged, which is determined based on whether an output voltage of the replaceable battery pack 112 has dropped below a minimum threshold (a "charging threshold") that indicates that the replaceable battery pack 112 has been discharged. Additionally or alternatively, the battery controller 104 may determine that an amount of power is required for vehicle use in addition to the amount of power that can be provided by either the replaceable battery pack 112 or fixed battery pack 110 alone.

At step 508, the battery controller 104 controls the fixed battery pack 110 and/or the replaceable battery pack 112 to power one or more of the motors 106 based on the comparison between the electrical characteristics of the fixed battery pack 110 and the electrical characteristics of the replaceable battery pack 112.

For example, if the replaceable battery pack 112 has been discharged and the fixed battery pack 110 still has charge, then the battery controller 104 switches from causing the replaceable battery pack 112 to charge to motors 106 to causing the fixed battery pack 110 to charge the motors 106.

Additionally or alternatively, the battery controller 104 may determine that an amount of power is required for vehicle use in addition to the amount of power that can be provided by either the replaceable battery pack 112 or fixed battery pack 110 alone. In response, the battery controller 104 causes the fixed battery pack 110 to power one set of wheels 108 and causes the replaceable battery pack 112 to power a different set of wheels 108 at the same time. The battery controller 104 may cause the fixed battery pack 110 and replaceable battery pack 112 to power different sets of wheels 108 for reasons other than simply a power requirement.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

It should be understood that many variations are possible based on the disclosure herein. Although features and elements are described above in particular combinations, each feature or element may be used alone without the other features and elements or in various combinations with or without other features and elements.

What is claimed is:

1. A battery system, comprising:
 a fixed battery pack;
 a replaceable battery pack; and
 a battery controller configured to:
  detect electrical characteristics of the fixed battery pack,
  detect electrical characteristics of the replaceable battery pack,
  compare the electrical characteristics of the fixed battery pack with the electrical characteristics of the replaceable battery pack to determine a charge state of the replaceable battery pack and the fixed battery pack relative to a predetermined charging threshold, and
  control either or both of the fixed battery pack and the replaceable battery pack to power one or more motors based on the comparison between the electrical characteristics of the fixed battery pack and the electrical characteristics of the replaceable battery pack.

2. The battery system of claim 1, wherein:
the fixed battery pack has bolts fastened to an enclosure.

3. The battery system of claim 1, wherein:
the replaceable battery pack has electrically or mechanically activated locks.

4. The battery system of claim 1, wherein comparing the electrical characteristics of the fixed battery pack with the electrical characteristics of the replaceable battery pack comprises:
determining whether the replaceable battery pack or the fixed battery pack are discharged below the charging threshold.

5. The battery system of claim 4, wherein controlling either or both of the fixed battery pack and the replaceable battery pack further comprises:
responsive to determining that neither the replaceable battery pack nor the fixed battery pack are discharged below the charging threshold, controlling the replaceable battery pack, but not the fixed battery pack, to power a motor of a vehicle.

6. The battery system of claim 4, wherein controlling either or both of the fixed battery pack and the replaceable battery pack further comprises:
responsive to determining that the replaceable battery pack is discharged below the charging threshold, but that the fixed battery pack is not discharged below the charging threshold, controlling the fixed battery pack, but not the replaceable battery pack, to power a motor of a vehicle.

7. The battery system of claim 1, wherein comparing the electrical characteristics of the fixed battery pack with the electrical characteristics of the replaceable battery pack comprises:
detecting that both the fixed battery pack and the replaceable battery pack are charged above the charging threshold.

8. The battery system of claim 7, wherein controlling either or both of the fixed battery pack and the replaceable battery pack further comprises:
responsive to detecting that both the fixed battery pack and the replaceable battery pack are charged above the charging threshold, causing the fixed battery pack to power a first motor of a vehicle and the replaceable battery pack to power a second motor of the vehicle.

9. The battery system of claim 1, wherein the battery controller is configured to:
cause the fixed battery pack to be recharged before the replaceable battery pack.

10. A method for controlling a battery system including a fixed battery pack, a replaceable battery pack, and a battery controller, the method comprising:
detecting, by the battery controller, electrical characteristics of the fixed battery pack,
detecting, by the battery controller, electrical characteristics of the replaceable battery pack,
comparing, by the battery controller, the electrical characteristics of the fixed battery pack with the electrical characteristics of the replaceable battery pack to determine a charge state of the replaceable battery pack and the fixed battery pack relative to a predetermined charging threshold, and
controlling, by the battery controller, either or both of the fixed battery pack and the replaceable battery pack to power one or more motors based on the comparison between the electrical characteristics of the fixed battery pack and the electrical characteristics of the replaceable battery pack.

11. The method of claim 10, wherein comparing the electrical characteristics of the fixed battery pack with the electrical characteristics of the replaceable battery pack comprises:
determining, by the battery controller, whether the replaceable battery pack or the fixed battery pack are discharged below the charging threshold.

12. The method of claim 11, wherein controlling either or both of the fixed battery pack and the replaceable battery pack further comprises:
responsive to determining that neither the replaceable battery pack nor the fixed battery pack are discharged below the charging threshold, controlling, by the battery controller, the replaceable battery pack, but not the fixed battery pack, to power a motor of a vehicle.

13. The method of claim 11, wherein controlling either or both of the fixed battery pack and the replaceable battery pack further comprises:
responsive to determining that the replaceable battery pack is discharged below the charging threshold, but that the fixed battery pack is not discharged below the charging threshold, controlling by the battery controller, the fixed battery pack, but not the replaceable battery pack, to power a motor of a vehicle.

14. The method of claim 10, wherein comparing the electrical characteristics of the fixed battery pack with the electrical characteristics of the replaceable battery pack comprises:
detecting, by the battery controller, that both the fixed battery pack and the replaceable battery pack are charged above the charging threshold.

15. The method of claim 14, wherein controlling either or both of the fixed battery pack and the replaceable battery pack further comprises:
responsive to detecting that both the fixed battery pack and the replaceable battery pack are charged above the charging threshold, causing, by the battery controller, the fixed battery pack to power a first motor of a vehicle and the replaceable battery pack to power a second motor of the vehicle.

16. The method of claim 10, further comprising:
causing, by the battery controller, the fixed battery pack to be recharged before the replaceable battery pack.

17. A vehicle comprising:
a first motor configured to power a first set of wheels; and
a battery system, comprising:
a fixed battery pack;
a replaceable battery pack; and
a battery controller configured to:
detect electrical characteristics of the fixed battery pack,
detect electrical characteristics of the replaceable battery pack,
compare the electrical characteristics of the fixed battery pack with the electrical characteristics of the replaceable battery pack to determine a charge state of the replaceable battery pack and the fixed battery pack relative to a predetermined charging threshold, and
control either or both of the fixed battery pack and the replaceable battery pack to power one or more motors based on the comparison between the electrical characteristics of the fixed battery pack and the electrical characteristics of the replaceable battery pack.

18. The vehicle of claim 17, wherein:
the fixed battery pack has bolts fastened to an enclosure.

19. The vehicle of claim 17, wherein:
the replaceable battery pack has electrically or mechanically activated locks.

20. The vehicle of claim 17, wherein comparing the electrical characteristics of the fixed battery pack with the electrical characteristics of the replaceable battery pack comprises:
determining whether the replaceable battery pack or the fixed battery pack are discharged below the charging threshold.

* * * * *

UNITED STATES PATENT AND TRADEMARK OFFICE
CERTIFICATE OF CORRECTION

| | |
|---|---|
| PATENT NO. | : 10,076,971 B2 |
| APPLICATION NO. | : 15/283953 |
| DATED | : September 18, 2018 |
| INVENTOR(S) | : Chendong Huang et al. |

It is certified that error appears in the above-identified patent and that said Letters Patent is hereby corrected as shown below:

In the Claims

Claim 13, Column 8, Line 27, insert a -- , -- after "controlling".

Signed and Sealed this
Nineteenth Day of February, 2019

Andrei Iancu
*Director of the United States Patent and Trademark Office*